Oct. 15, 1957 P. S. HOSPODAR 2,809,443
EDUCATIONAL TOY
Filed Jan. 15, 1954 2 Sheets-Sheet 1
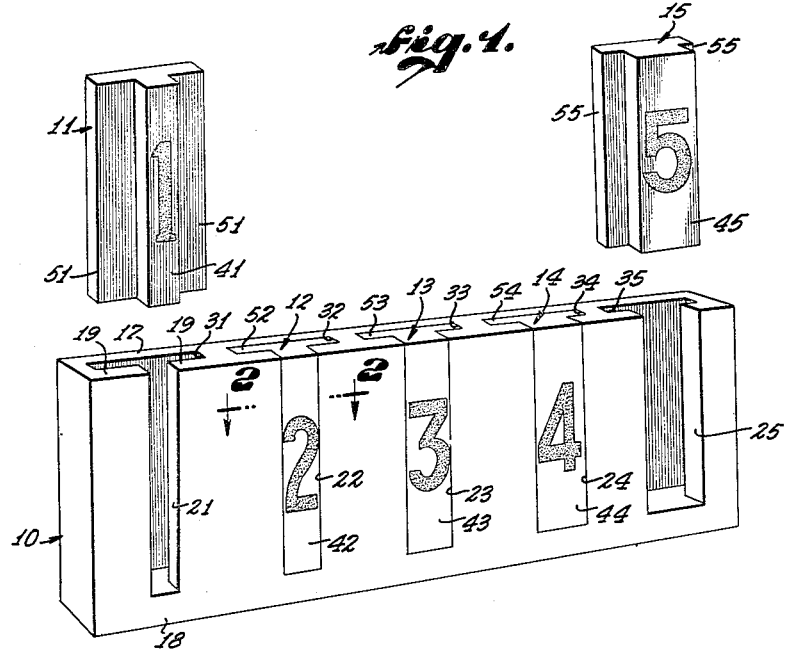
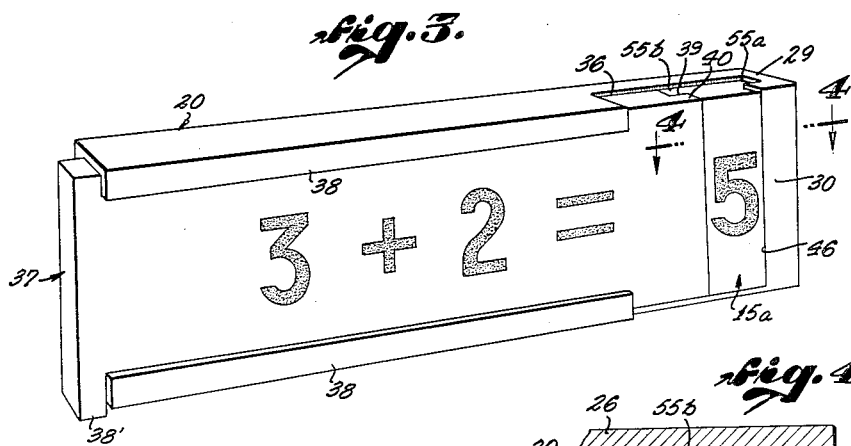
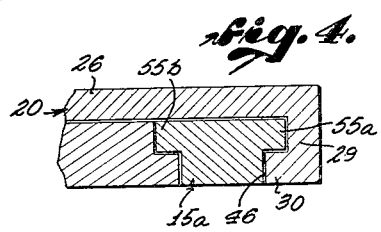
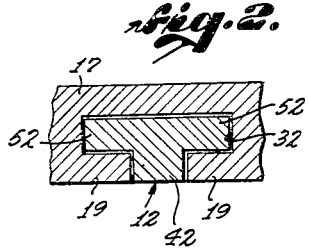
PAUL S. HOSPODAR,
INVENTOR.
SELLERS & LATTA,
ATTORNEYS.
BY Lynn H. Latta

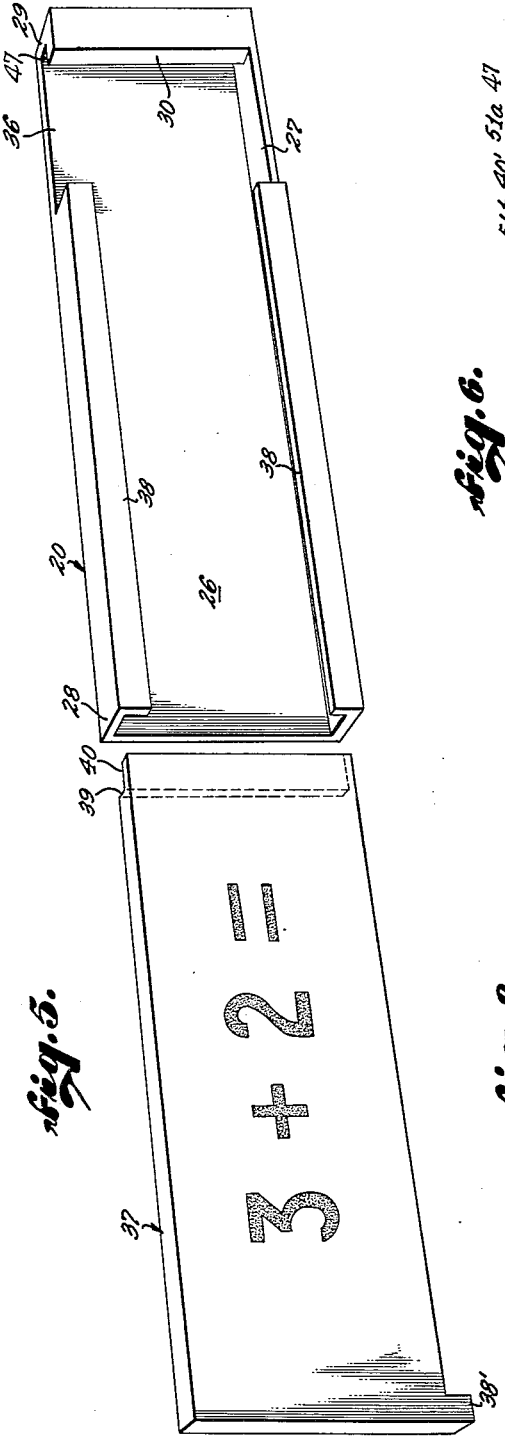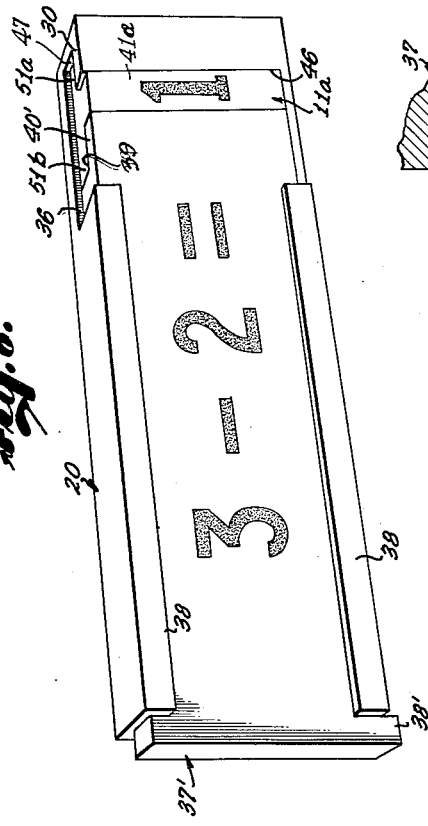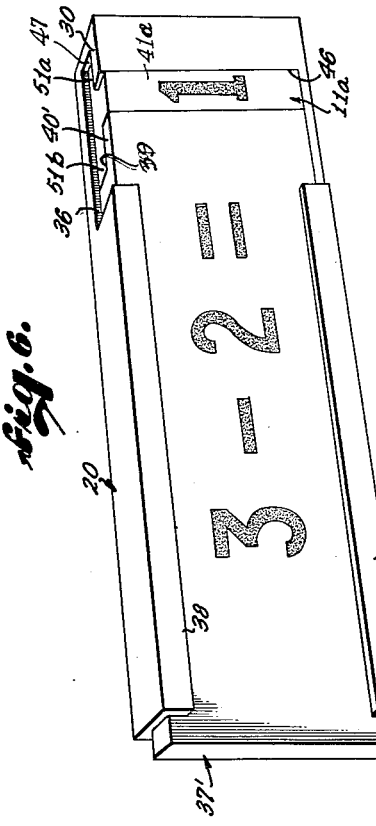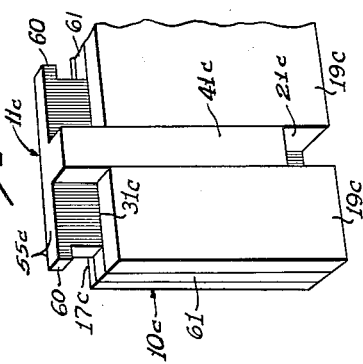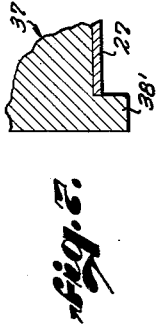

United States Patent Office 2,809,443
Patented Oct. 15, 1957

2,809,443
EDUCATIONAL TOY
Paul S. Hospodar, Van Nuys, Calif.

Application January 15, 1954, Serial No. 404,187

4 Claims. (Cl. 35—9)

This invention relates to an educational toy or apparatus for teaching to children matters such as arithmetic, spelling and the like. The primary object of the invention is to provide an apparatus including parts to be assembled to designate a problem and its answer. Specifically, the invention contemplates an apparatus wherein a series of blocks or panels are assembled by the child in a holder or rack such as to spell out the problem and the answer thereto.

A particular object of the invention is to provide such an educational apparatus wherein it is impossible for the child to make an error in assembling the parts which go together to spell out the problem and its answer. To this end, the invention contemplates an apparatus wherein the end bearing blocks or other parts are so constructed in relation to a holder or rack as to be inserted only in predetermined positions in such a holder or rack, with the relation being such that the right answer must necessarily be associated with the problem which has been inserted into the rack.

Other objects will become apparent in the ensuing specifications and appended drawings in which:

Fig. 1 is an exploded view showing a rack and a series of blocks adapted to be inserted therein, each in its own predetermined position;

Fig. 2 is a transverse horizontal sectional view through a portion of said apparatus; taken on the line 2—2 of Fig. 1;

Fig. 3 is a perspective view of an apparatus embodying a modified form of the invention;

Fig. 4 is a horizontal sectional view of the same taken on the line 4—4 of Fig. 3;

Fig. 5 is an exploded perspective view of the apparatus of Fig. 3;

Fig. 6 is a perspective view of the apparatus of Fig. 3 showing a different selection of insert panels;

Fig. 7 is a detailed sectional view of one end portion thereof; and

Fig. 8 is a fragmentary perspective view of another modified form of the invention;

Referring now to the drawings in detail, my improved educational toy may take various forms such as those shown in Figs. 1 and 3 respectively. Describing first the form shown in Fig. 1, it comprises a holder or rack, designated generally by the numeral 10, together with a series of blocks or panels, indicated generally at 11, 12, 13, 14 and 15 respectively.

Holder 10 may be moulded of synthetic resin plastic material or metal or may be a composite structure of a series of laminations attached one to another. In general, it constitutes an elongated rectangular body having solid, continuous rear and bottom portions 17 and 18 respectively, having a front wall comprised of a series of flanges 19 which are horizontally spaced to define slots 21, 22, 23, 24 and 25, and having a series of internal sockets 31, 32, 33, 34 and 35 respectively. The sockets 31–35 join the slots 21–25 respectively to form T-section recesses for the reception of the blocks 11–15 respectively.

Blocks 11–15 comprise respectively, central body panel portions 41, 42, 43, 44 and 45 respectively, together with pairs of flat wings 51, 52, 53, 54 and 55 respectively, the body panels 41–45 being receivable in the respective slots 21–25 and the wings 51–55 being receivable respectively in the internal sockets 31–35.

The invention is characterized particularly by the fact that the slots 21–25 and, correspondingly, the body panels 41–45 of the blocks, are of progressively increasing width from one end (e. g. the left end) of the rack 10 to the other end thereof; whereas the overall widths of the pairs of wings 51–55 and, correspondingly, of the sockets 31–35 are progressively of decreasing dimension in the same direction, end to end of the rack 10. It will now be apparent that it is impossible to insert any of the blocks 11–15 into any recess of the rack 10 except the one recess for which it is intended. As to any recess other than the proper recess, either the body portion 41–45 or, alternatively, the wings 51–55 of any selected block, will be too wide to be received in the corresponding slots 21–25 and sockets 31–35 of the rack.

As an example of a particular problem that may be represented by the apparatus of Fig. 1, the blocks 11–15 may be provided, on the front faces of body panels 41–45 thereof, with a series of consecutive numerals such as the numerals "1," "2," "3," "4," and "5" illustrated thereon. The arrangement of numerals on the face of blocks 11–15 is such that, when the blocks are inserted in rack 10 in the only possible arrangement therein, the proper consecutive arrangement of the numerals "1," "2," "3," "4," "5" will be displayed.

Fig. 3 illustrates a modified form of the invention wherein a rack or holder 20 includes a continuous rectangular rear wall 26 (Fig. 5) a continuous bottom flange 27, and a top flange 28 which extends continuously from one end of the holder to a point which is spaced from an upright end member 29 at the other end of the holder, so as to define, at the top of the holder, an insertion slot 36.

At the opposite (first mentioned) end, the holder 20 is open for the insertion therein of a problem panel 37. Flanges 38, projecting downwardly from top flange 28 and upwardly from bottom flange 27, are spaced forwardly of back member 26 to define slides in which the problem panel 37 is received. At its end opposite that which is inserted into holder 20, panel 37 has a downwardly projecting lug 38' which engages against the end of holder 20 to limit the insertion of panel 37 at a position where its other end is spaced a determined distance from a vertical flange 30 which projects from end part 29.

At its end which is inserted into holder 20, panel 37 has a corner notch 39 which is defined by a projecting end flange 40. In the fully inserted position of panel 37 as determined by the engagement of lug 38' against the open end of holder 20, flange 40 is spaced from vertical flange 30 of the holder to define a vertical front opening slot 46 which is adapted to receive the body panel (corresponding to body panels 41, 45 etc.), of a corresponding block 11a or 15a, shown in Figs. 6 and 3 respectively, or of any of the intervening series of blocks, corresponding to the intervening series of '2," "3," and "4" blocks shown in Fig. 1 but not individually illustrated for Figs. 3–6. A channel 47 is defined between vertical flange 30 and rear wall 26 of holder 20. Between corner notch 39 of panel 37 and channel 47 there is defined a socket for receiving the wings 51a, 51b (Fig. 6) or 55a, 55b (Fig. 4) of one of the blocks 11a, or 15a, or any of the other blocks of the series, depending upon the width to which slot 46 is adjusted. The width of this socket will be determined by the length of the particular panel 37 (or 37'—Fig. 6), etc. which is inserted into the holder. The series of blocks including 11a and 15a in this case will have on one side a wing (51a for block 11a) which is the same width for all blocks whereas the flange on the other side including flanges 51b and 55b is of varying width to correspond to the varying width of the end flange of the insert panel (e. g. flange 40 of panel 37 and flange 40' of panel 37' being of different widths).

With the apparatus of Figs. 3–7, the face of panels 37, 37' etc., may carry various legends such as the arithmetic problems which are illustrated on the two panels 37 and 37' shown by way of example.

Fig. 8 illustrates how the holder of Fig. 1 may be modified to eliminate the bottom part 18 thereof. In Fig. 8, slots 21c are open both at the top and bottom, and block 11c is provided at its upper end with fingers 60 projecting laterally from the upper corners of its wings 55c, and adapted to rest upon the upper face of holder 10c. Central body panels 41c are of such length as to extend to the bottom of slot 21c when fingers 60 are resting upon holder 10c. In Fig. 8 the block 11c is shown in a position somewhat raised from its fully inserted position, in order to better illustrate the construction.

Fig. 8 also illustrates how holder 10 may be fabricated as a composite structure of a series of laminations attached one to another as hereinbefore mentioned. In this case, the back member 17c comprises a flat panel extending the full length of the holder 10c. Secured to the forward face of back panel 17b are a series of vertically extending spacer strips 61, which are spaced longitudinaly of the holder to define the lateral margins of the series of graduated width sockets beginning with the sockets 31c disclosed in Fig. 8. Secured to spacer strip 61 are the series of flange members including the first series of flanges 19c which define the slots 21c as the first of the series of graduated width slots. It will be understood that, aside from the elimination of the bottoms of the sockets, the holder 10c may be the same as the holder 10 of Fig. 1, including the same series of internal sockets 31c, diminishing in width from the end of the device shown in Fig. 8 toward the opposite end, and the corresponding series of slots 21c, increasing in width from the end shown in Fig. 8 toward the other end; and that the series of blocks, beginning with block 41c may correspond to the series of blocks shown in Fig. 1 with the exception that the wings 60 are added to each block.

I claim:

1. In an educational apparatus: a horizontally elongated holder having therein a horizontal row of vertical recesses, each of T-shaped cross section and including a front-opening vertical slot and an internal socket communicating with said slot and having a pair of lateral socket spaces projecting from the sides of the respective slot lengthwise of the holder, said internal sockets being of decreasing width and said front-opening slots being of increasing width from one end of the holder to the other; and a series of blocks each of a T-shaped cross section corresponding to that of a respective recess, including a central body portion receivable in a respective slot and a wing portion receivable in respective lateral socket spaces, said body and wing portions corresponding in width to the slot and internal sockets of a respective recess whereby each block can be received only in its respective recess, said body portions of the blocks having respective indicia thereon, adapted to assume a predetermined arrangement for educational information, when the series of blocks are inserted in the holder.

2. Apparatus as defined in claim 1, wherein the holder includes a bottom upon which the lower ends of the blocks are adapted to rest.

3. Apparatus as defined in claim 1 wherein the holder recesses are open both at their upper and lower ends and wherein said blocks are provided at their upper ends with laterally projecting fingers adapted to rest upon the upper face of the holder.

4. Apparatus as defined in claim 1, wherein said holder is a composite structure of a series of laminations attached one to another.

References Cited in the file of this patent

UNITED STATES PATENTS

| 1,050,327 | Aikins | Jan. 14, 1913 |
| 1,369,379 | Moore | Nov. 8, 1921 |
| 2,395,129 | Lewis | Feb. 19, 1946 |
| 2,415,342 | Donner | Feb. 4, 1947 |

FOREIGN PATENTS

| 214,098 | Great Britain | Apr. 17, 1924 |